(12) United States Patent
Vinapamula Venkata et al.

(10) Patent No.: US 9,479,597 B2
(45) Date of Patent: *Oct. 25, 2016

(54) SECURE NETWORK ADDRESS TRANSLATION (NAT) PORT BLOCK ALLOCATION

(71) Applicant: Juniper Networks, Inc., Sunnyvale, CA (US)

(72) Inventors: Suresh Kumar Vinapamula Venkata, Santa Clara, CA (US); Rajesh Mohan, Cupertino, CA (US); Sarat Kamisetty, Fremont, CA (US); Reinaldo Penno, San Jose, CA (US); Sanjay V. Agrawal, San Ramon, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/826,591

(22) Filed: Aug. 14, 2015

(65) Prior Publication Data

US 2015/0350336 A1  Dec. 3, 2015

Related U.S. Application Data

(63) Continuation of application No. 13/459,482, filed on Apr. 30, 2012, now Pat. No. 9,112,919.

(51) Int. Cl.
| | |
|---|---|
| *G06F 15/16* | (2006.01) |
| *G06F 15/17* | (2006.01) |
| *H04L 29/08* | (2006.01) |
| *H04L 29/12* | (2006.01) |

(52) U.S. Cl.
CPC .............. *H04L 67/141* (2013.01); *H04L 61/25* (2013.01); *H04L 61/255* (2013.01); *H04L 61/256* (2013.01); *H04L 61/2514* (2013.01); *H04L 61/2517* (2013.01); *H04L 67/142* (2013.01); *H04L 61/6068* (2013.01)

(58) Field of Classification Search
CPC ........................... H04L 61/2517; H04L 61/25
USPC .......................................... 709/228, 223, 224
See application file for complete search history.

(56) References Cited

U.S. PATENT DOCUMENTS

| | | | | |
|---|---|---|---|---|
| 7,159,031 B1 * | 1/2007 | Larkin | ..................... | H04L 41/18 370/355 |
| 7,227,841 B2 * | 6/2007 | Mullendore | ........ | H04L 12/5693 370/230 |
| 7,543,052 B1 * | 6/2009 | Cesa Klein | ........... | H04L 43/026 709/223 |

(Continued)

OTHER PUBLICATIONS

Juniper Networks, Inc., Carrier Grade NAT Implementation Guide. 2011. 32 pages.

*Primary Examiner* — Kristie Shingles
*Assistant Examiner* — Timothy Sowa
(74) *Attorney, Agent, or Firm* — Harrity & Harrity LLP

(57) ABSTRACT

A node is configured to receive, from a second node, a request to establish a session; perform, in response to the request, a network address translation (NAT) operation to establish the session, the NAT operation causing a first port block to be allocated to the session, the first port block including a first set of ports via which traffic, associated with the session, is transported; determine that the set of ports are no longer available for the session; determine whether a quantity of times that the first port block has been allocated to the session is greater than a threshold; and retain the first port block, for the session, when the quantity of times that the first port block has been allocated to the session is not greater than the threshold.

20 Claims, 9 Drawing Sheets

(56) References Cited

U.S. PATENT DOCUMENTS

| | | |
|---|---|---|
| 9,112,919 B1 * | 8/2015 | Vinapamula Venkata .............. H04L 61/2517 709/228 |
| 2005/0063398 A1 * | 3/2005 | Choudhury ........... H04L 49/602 370/401 |
| 2011/0047256 A1 * | 2/2011 | Babu ................. H04L 29/12367 709/223 |
| 2012/0179830 A1 * | 7/2012 | Ait-Ameur ........... H04L 67/125 709/228 |

* cited by examiner

SECURE NETWORK ADDRESS TRANSLATION (NAT) PORT BLOCK ALLOCATION

RELATED APPLICATION

This application is a continuation of U.S. patent application Ser. No. 13/459,482, filed Apr. 30, 2012 (now U.S. Pat. No. 9,112,919), which is incorporated herein by reference.

BACKGROUND

Computing and communication networks typically include nodes, such as routers, firewalls, switches or gateways, which transfer or switch data, such as packets, from one or more sources to one or more destinations. The nodes may operate on the packets as the packets traverse the network, such as by forwarding or filtering packet-based network traffic.

Nodes may perform network address translation (NAT) operations to allow network addresses (e.g., Internet Protocol (IP) addresses) to be allocated for communication sessions that are active and/or are being established. The nodes may allocate, to the sessions, sets of ports (e.g., port blocks), associated with the network addresses, that allow traffic flows, associated with the communication session, to be transported via the ports.

The nodes may also perform the NAT operations to allow other network addresses to be released from sessions that have expired and/or are no longer active. The nodes may release, from the sessions, other port blocks, associated with the other network addresses. Releasing the network addresses and/or the port blocks may allow the network addresses and/or port blocks to be reallocated to other communication sessions. The nodes may, thus, perform the NAT operations in a manner that avoids exhausting available network addresses.

SUMMARY

According to one aspect, a method may include receiving, by a first node device and from a second node device, a request to establish a session; performing, by the first node device and in response to the request, a network address translation (NAT) operation to establish the session. The NAT operation may cause a first port block to be allocated to the session, where the first port block may include a first set of ports via which traffic, associated with the session, is transported. The method may also include determining, by the first node device, that the set of ports are no longer available for the session; determining, by the first node device, whether a quantity of times that the first port block has been allocated to the session is greater than a threshold; and retaining, by the first node device and for the session, the first port block when the quantity of times that the first port block has been allocated to the session is not greater than the threshold.

According to another aspect, a device may include a processor to receive an indication that a first port block of a group of port blocks that was previously allocated to a communication session is to be released from the session. The first port block may include a first set of ports via which traffic, associated with the session, is transported. The group of port blocks may correspond to a group of addresses that are allocated to the device. The processor may also determine a quantity of times that the first port block has been allocated to the session; may release the first port block when the quantity of times that the first port block has been allocated to the session is greater than a threshold; and may identify, based on the release of the first port block, a second port block, of the group of port blocks. The second port block may be a least recently used port block among the group of port blocks. The processor may allocate the second port block to the session, where the second port block may include a second set of ports; and may transport the traffic via one or more of the second set of ports.

According to still another aspect, a system may include one or more devices to receive, from a device that communicates with host devices, a request to establish a session associated with one of the host devices; perform, in response to the request, a network address translation (NAT) operation to establish the session. The NAT operation may cause a private address to be associated with the device and may enable the device to communicate with the system. The NAT operation may also cause a public address, of a set of public addresses allocated to the system, to be associated with the private address and may enable the device to communicate, via the system, with a destination device. The NAT operation may further cause one or more port blocks, of a plurality of port blocks associated with the set of public addresses, to be allocated to the public address, where each of the one or more port blocks may include a respective set of ports for transporting traffic. The one or more devices may also be to determine that a first set of ports within a first port block, of the one or more port blocks, are no longer being used to transport the traffic; determine whether the first port block can be reallocated to the session when the first set of ports are no longer being used; release, from the session, the first port block when the first port block cannot be reallocated to the session; and allocate, to the session, a second port block, where the second port block may be a least recently used port block of the set of port blocks.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements.

Systems and/or methods, described herein, may enable a node to perform a network address translation (NAT) operation by releasing and/or allocating a set of ports (hereinafter referred to herein as a "port block"), associated with a network address (e.g., an Internet Protocol (IP) address), in a secure manner. The node may determine a quantity of times that a port block, associated with a communication session, has been allocated to a session. The node may determine that the port block is to be released when the quantity of times is greater than a threshold. The node may also, or alternatively, allocate a different block for the session when the node determines that the port block is to be released. Releasing the port block when the quantity of times is greater than the threshold may increase a level of security associated with the session.

Additionally, or alternatively, the node may allocate a first port block to a session that is larger than one or more subsequent port blocks that are allocated to the session. The first port block, being larger than the subsequent port blocks, may reduce a quantity of port blocks that are allocated to establish a session. Additionally, or alternatively, the allocation of smaller subsequent port blocks may enable ports to be allocated to the session on an as needed basis. Additionally, or alternatively, the node may release a first port block to permit the first port block to be reallocated to another session. The node may reallocate the first port block to the other session and/or may segment the first port block into two or more smaller port blocks that can be allocated to the other session on an as needed basis.

Additionally, or alternatively, the node may release and/or reallocate a port block using a global least recently used (LRU) list of port blocks (hereinafter referred to as "LRU list"). The LRU list may correspond to port blocks associated with all NAT IP addresses that are allocated to the node. Use of the LRU list may enable a port block to be reallocated when the port block is a least recently used port block among available port blocks. Thus, the period of time when the port block is not reallocated may avoid ambiguities or errors associated with network time corrections within the network. The errors may be caused when a time correction within a network (e.g., based on network time protocol (NTP) correction) occurs during a time period when the port block is being released and/or reallocated. Additionally, or alternatively, allocation of a least recently used block based on the LRU list may cause port block utilization to resemble a random utilization, which may increase a level of security within the network.

Figure 1:
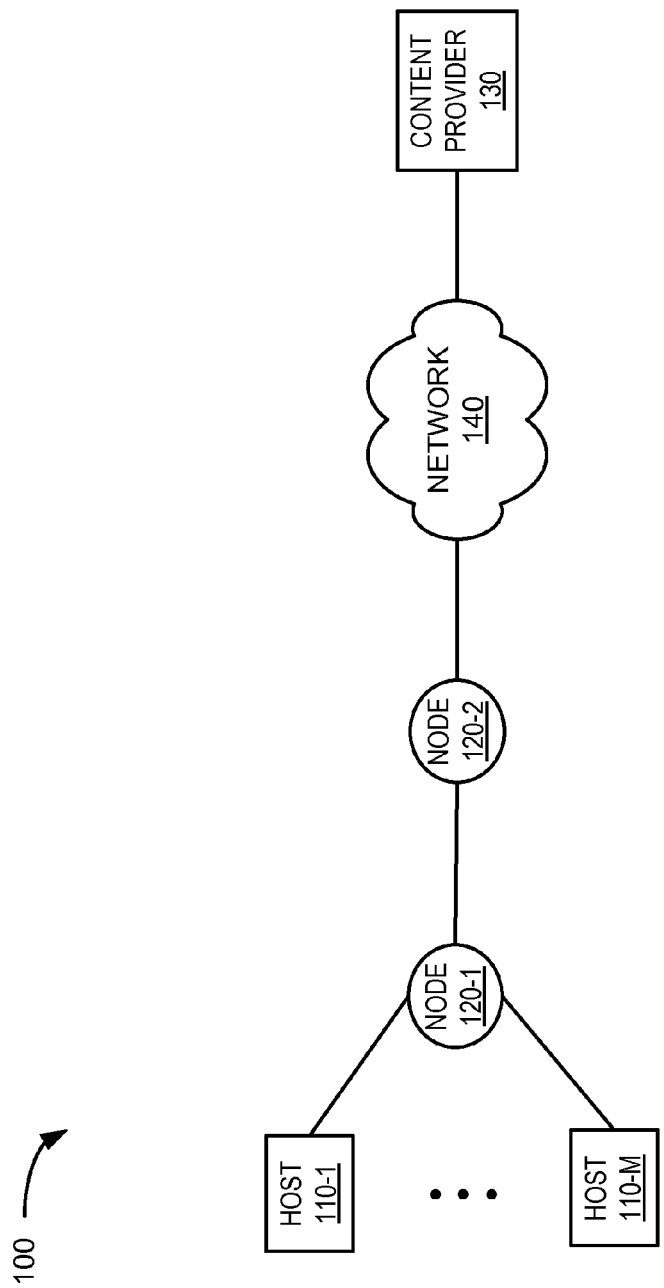
FIG. 1 is a diagram of an example environment in which systems and/or methods described herein may be implemented.

FIG. 1 is a diagram of an example environment 100 in which systems and/or methods described herein may be implemented. As shown in FIG. 1, environment 100 may include a group of host devices 110-1, . . . , 110-M (where M≥1) (hereinafter referred to collectively as "hosts 110" and individually as "host 110"), a pair of nodes 120-1 and 120-2 (hereinafter referred to collectively as "nodes 120" and individually as node "120"), a content provider device 130 (hereinafter referred to as "content provider 130"), and a network 140. The number of nodes, devices and/or networks, illustrated in FIG. 1, is provided for explanatory purposes only. In practice, there may be additional nodes, devices and/or networks; fewer nodes, devices and/or networks; different nodes, devices and/or networks; or differently arranged nodes, devices and/or networks than illustrated in FIG. 1.

Also, in some implementations, one or more of the nodes and/or host devices, of environment 100, may perform one or more functions described as being performed by another one or more of the nodes and/or host devices of environment 100. The nodes and/or host devices of environment 100 may interconnect via wired connections, wireless connections, or a combination of wired and wireless connections.

Host 110 may include any computation and communication device, such as a wireless mobile communication device that is capable of communicating with node 120. For example, host 110 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a personal computer, a tablet computer, a landline telephone, a set top box (STB), a television, a camera, a personal gaming system, or another type of computation and communication device. Alternatively, or additionally, host 120 may be a server device that may gather, process, search, store, and/or provide information in a manner similar to that described herein.

Node 120 may include a network device that transmits traffic (e.g., packets). For example, node 120 may take the form of a routing device, a switching device, a multiplexing device, or a device that performs a combination of routing, switching, and/or multiplexing functions. In one implementation, node 120 may be a digital device. Alternatively, or additionally, node 120 may be an optical device a combination of a digital device and an optical device, etc.

Node 120 may include an internal or external storage device and/or memory that stores information associated with node 120 operations. In one example, node 120 may store, in the storage device and/or memory, network topology information, routing tables, and/or packet forwarding tables. Node 120 may receive, process, and/or transmit packets traversing environment 100. Node 120 may add and/or append (push) information (e.g., headers, trailers, tags, etc.) to incoming and/or outgoing packets. Node 120 may remove and/or extract information from incoming and/or outgoing packets.

Node 120-1 may represent a customer premises equipment (CPE) node that communicates with hosts 110. Node 120-1 may, for example, be associated with a business, a facility, a residence, etc. with which hosts 120 are associated. Node 120-1 may enable hosts 110 to communicate with network 130 via node 120-2. Node 120-1 may also, or alternatively, perform network address translation (NAT) operations to dynamically allocate IP addresses and/or ports to hosts 120 to permit hosts 120 to communicate with node 120-2.

Node 120-2 may communicate with node 120-1 to establish communication sessions with hosts 110 to enable hosts 110 to communicate with network 140. Node 120-2 may, for example, perform a NAT operation to establish a communication session associated with host 110. Node 120-2 may allocate a public IP address to host 110 that enables content provider 130 and/or network 140 to communicate with host 110 via node 120-2 and node 120-1. Node 120-2 may also, or alternatively, allocate one or more port blocks, to the session, via which flows of packets, associated with the session, can be transported. Node 120-2 may also, or alternatively, release a port block from the session when the port block is no longer being used to transport flows of packets and/or when a time period, that the port block is to be allocated to the session, times out. Node 120-2 may also, or alternatively, reuse a port block by reallocating the port block to the session rather than releasing the port block for use with another session.

Node 120-2 may vary a quantity of ports, associated with a port block, based on whether the port block corresponds to a first port block that is allocated to establish the session. For example, node 120-2 may cause a greater quantity of ports to be associated with the first port block than a later allocated second port block. Additionally, or alternatively, node 120-2 may release the first port block and may reallocate the first port block to establish another session associated with another host 110. Additionally, or alternatively, node 120-2 may segment the first port block and may allocate, to another session, one or more segments of the first port block as one or more second port blocks.

Additionally, or alternatively, node 120-2 may maintain a LRU list across all NAT IP addresses that are allocated, by network 140, to node 120-2. For example, node 120-2 may store an entry into the LRU list when a port block is released from a session. The entry may indicate a time at which the port was released and/or an IP address with which the port block is associated. Node 120-2 may also, or alternatively, identify an entry, within the LRU list, that has been stored for the longest period of time and may identify a least recently used port block that corresponds to the identified entry. Node 120-2 may allocate the least recently used port block to a session.

Content provider 130 may include one or more server devices, or other types of computation and communication devices, that provide any type or form of content. For example, content provider 130 may provide free television broadcasts (e.g., local broadcasts, such as NBC®, CBS®, ABC®, and/or FOX®), for-pay television broadcasts (e.g., TNT®, ESPN®, HBO®, CINEMAX®, CNN®, etc.), and/or Internet-based content (e.g., YOUTUBE®, VIMEO®, NETFLIX®, HULU®, VEOH®, etc.) streamed from web sites. Content provider 130 may produce media streams. A "media stream," as used herein, may refer to stream of content that includes video content (e.g., a video stream), audio content (e.g., an audio stream), textual content (e.g., a textual stream), and/or a combination of the aforementioned content. Additionally, or alternatively, content provider 130 may provide web pages, documents, images, advertising content, audio, video, text, data, etc. Content provider 130 may also, or alternatively, provide applications and/or services, such as games, scripts, messaging services, etc.

Network 140 may include one or more wired and/or wireless networks. For example, network 140 may include a cellular network, the Public Land Mobile Network (PLMN), a second generation (2G) network, a third generation (3G) network, a fourth generation (4G) network (e.g., a long term evolution (LTE) network), a fifth generation (5G) network, and/or another network. Additionally, or alternatively, network 140 may include a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks.

Figure 2:
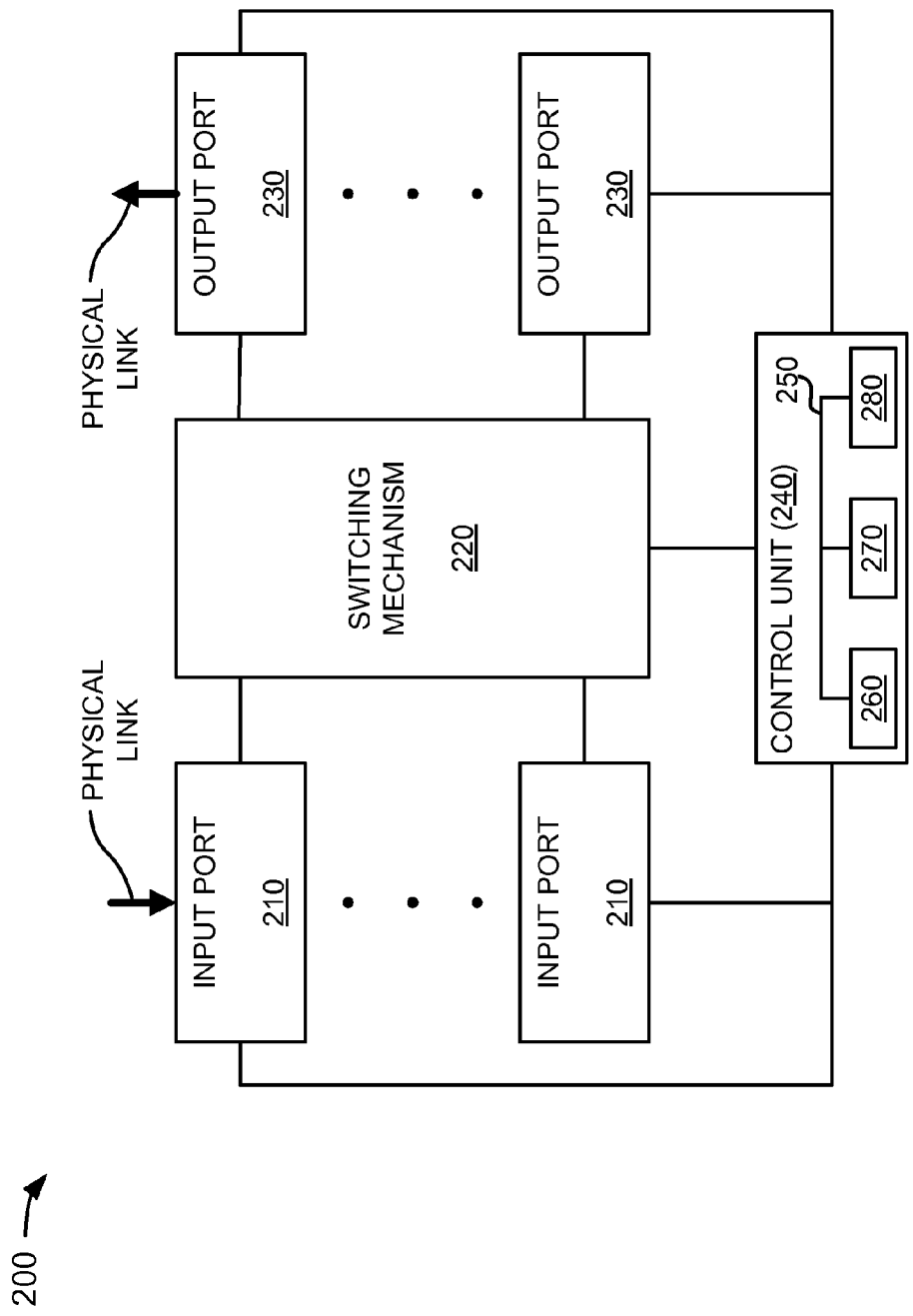
FIG. 2 is a diagram of example components of one or more network nodes of FIG. 1.

FIG. 2 is a diagram of example components of a device 200 that may correspond to request monitor 140, response monitor 150, or network device 170 (FIG. 1). In some instances, request monitor 140, response monitor 150, or network device 170 may include one or more devices 200. As shown in FIG. 2, device 200 may include input ports 210, a switching mechanism 220, output ports 230, and a control unit 240.

Input ports 210 may be a point of attachment for physical links and may be a point of entry for incoming traffic, such as packets. Input ports 210 may carry out data link layer encapsulation and decapsulation. In an example implementation, input ports 210 may send and/or receive packets.

Switching mechanism 220 may interconnect input ports 210 with output ports 230. Switching mechanism 220 may be implemented using many different techniques. For example, switching mechanism 220 may be implemented via busses, crossbars, and/or with shared memories which may act as temporary buffers to store traffic from input ports 210 before the traffic is eventually scheduled for delivery to output ports 230.

Output ports 230 may store packets and may schedule packets for service on output physical links. Output ports 230 may include scheduling algorithms that support priorities and guarantees. Output ports 230 may support data link layer encapsulation and decapsulation, and/or a variety of higher-level protocols. In an example implementation, output ports 230 may send packets and/or receive packets.

Control unit 240 may use routing protocols and one or more forwarding tables for forwarding packets. Control unit 240 may connect with input ports 210, switching mechanism 220, and output ports 230. Control unit 240 may compute a forwarding table, implement routing protocols, and/or run software to configure and manage device 200. Control unit 240 may handle any packet whose destination address may not be found in the forwarding table.

In an example implementation, control unit 240 may include a bus 250 that may include a path that permits communication among a processor 260, a memory 270, and a communication interface 280. Processor 260 may include one or more processors, microprocessors, ASICs, FPGAs, or other types of processing units that may interpret and execute instructions. Memory 270 may include a RAM, a ROM device, a magnetic and/or optical recording medium and its corresponding drive, and/or another type of static and/or dynamic storage device that may store information and instructions for execution by processor 260. Memory 270 may also temporarily store incoming traffic (e.g., a header of a packet or an entire packet) from input ports 210, for processing by processor 260, before a packet is directed back to switching mechanism 220, queued in switching mechanism 220, and eventually scheduled to be sent to output ports 230. Communication interface 280 may include any transceiver-like mechanism that enables control unit 240 to communicate with other devices and/or systems.

Device 200 may perform certain operations, as described herein. Device 200 may perform these operations in response to processor 260 executing software instructions contained in a computer-readable medium, such as memory 270. The software instructions may be read into memory 270 from another computer-readable medium, such as a data storage device, or from another device via communication interface 280. The software instructions contained in memory 270 may cause processor 260 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

Figure 3:
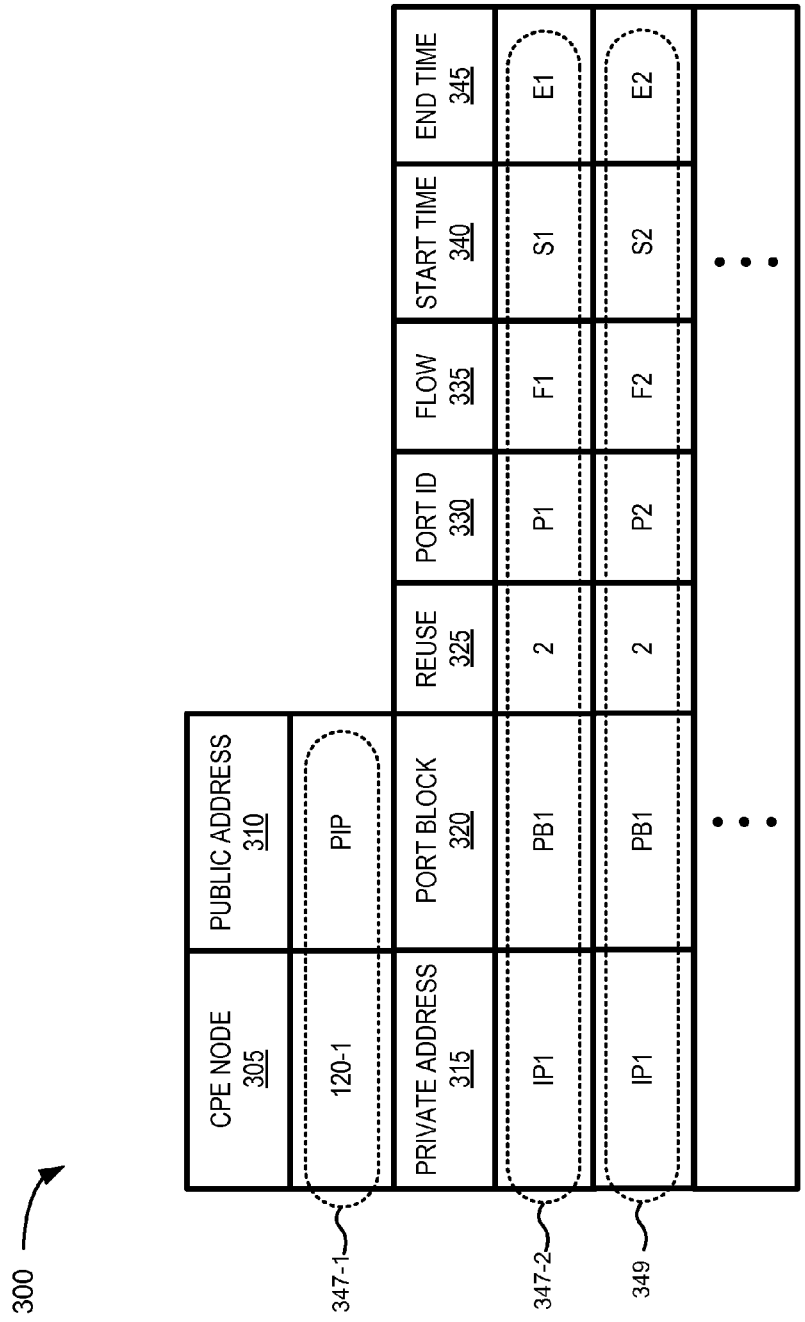
FIG. 3 is a diagram of an example data structure that stores information associated with network address translation (NAT) bindings created by a network node of FIG. 1.

FIG. 3 is a diagram of an example data structure 300 that stores information associated with NAT bindings created by node 120-2. Data structure 300 may be stored in a memory and/or storage device associated with node 120-2. As shown in FIG. 3, data structure 300 may include a collection of fields, such as a customer premises equipment (CPE) node field 305, a public address field 310, a private address field 315, a port block field 320, a reuse field 325, a port identifier (ID) field 330, a flow field 335, a start time field 340, and an end time field 345. Data structure 300 includes fields 305-345 for explanatory purposes. In practice, data structure 300 may include additional fields, fewer fields, different fields, or differently arranged fields than are described with respect to data structure 300.

CPE node field 305 may store information associated with a CPE node (e.g. 120-1) with which node 120-2 is communicating via a communication session associated with host 110. For example, the information associated with node 120-1 may include a network address associated with node 120-1 (e.g., a media access control (MAC) address, etc.) and/or a device identifier associated with node 120-1 (e.g., an electronic serial number, etc.). Public address field 310 may store a public IP address (e.g., an IP version 4 (IPv4) address, an IP version 6 (IPv6) address, etc.) associated with the communication session that is used by content provider 130 and/or network 140 to communicate with host 110 and/or node 120-1 via node 120-2.

Private address field 315 may store a private IP address (e.g., an IPv4 address, an IPv6 address, etc.), associated with the communication session, that is used by host 110 and/or node 120-1 to communicate with content provider 130 and/or network 140 via node 120-2. Port block field 320 may store information identifying a port block (e.g., a port block ID, etc.), associated with the public IP address and/or the private IP address, that is allocated to the communication session. Reuse field 325 may store a value identifying a quantity of times that node 120-2 has reallocated the port block to establish and/or maintain the communication session. Port ID field 330 may store information that identifies (e.g., a port identifier) a port associated with the port block.

Flow field 335 may store information that identifies a traffic flow associated with the communication session that is being transported, by node 120-2, via the port identified by port ID field 330. The information that identifies the traffic flow may, for example, identify an access point name (APN), an application and/or service being access (e.g., an application and/or service name, an application and/or service identifier, etc.), a packet data network (PDN) identifier, etc. Start time field 340 may identify a time when the port was allocated to the communication session and/or the flow. End time field 345 may identify a time at which the allocation of the port expires.

By way of example, node 120-2 may receive a flow of traffic, from node 120-1, relating to a session associated with host 110. Node 120-2 may create NAT bindings, associated with the flow of traffic, to be used to establish and/or maintain the session. For example, node 120-2 may allocate an available port block (e.g., PB1) to the session by associating, within data structure 300, the port block with a private IP address (e.g., IP1) and a public IP address (e.g., PIP) (e.g., as shown by ellipses 347-1 and 347-2). Node 120-2 may also, or alternatively, store a quantity of times that the port block as been reused for the session (e.g., 2), an identifier (e.g., P1) associated with a port via which the traffic flow (e.g., F1) is to be transported (e.g., as shown by ellipse 347-1). Additionally, or alternatively, node 120-2 may store a start time at which the port is allocated (e.g., S1) and an end time at which allocation of the port is to expire (e.g., E1) (e.g., as shown by ellipse 347-1). Similarly, node 120-2 may create NAT bindings relating to other traffic flows associated with the session (e.g., as shown by ellipse 349).

Figure 4:
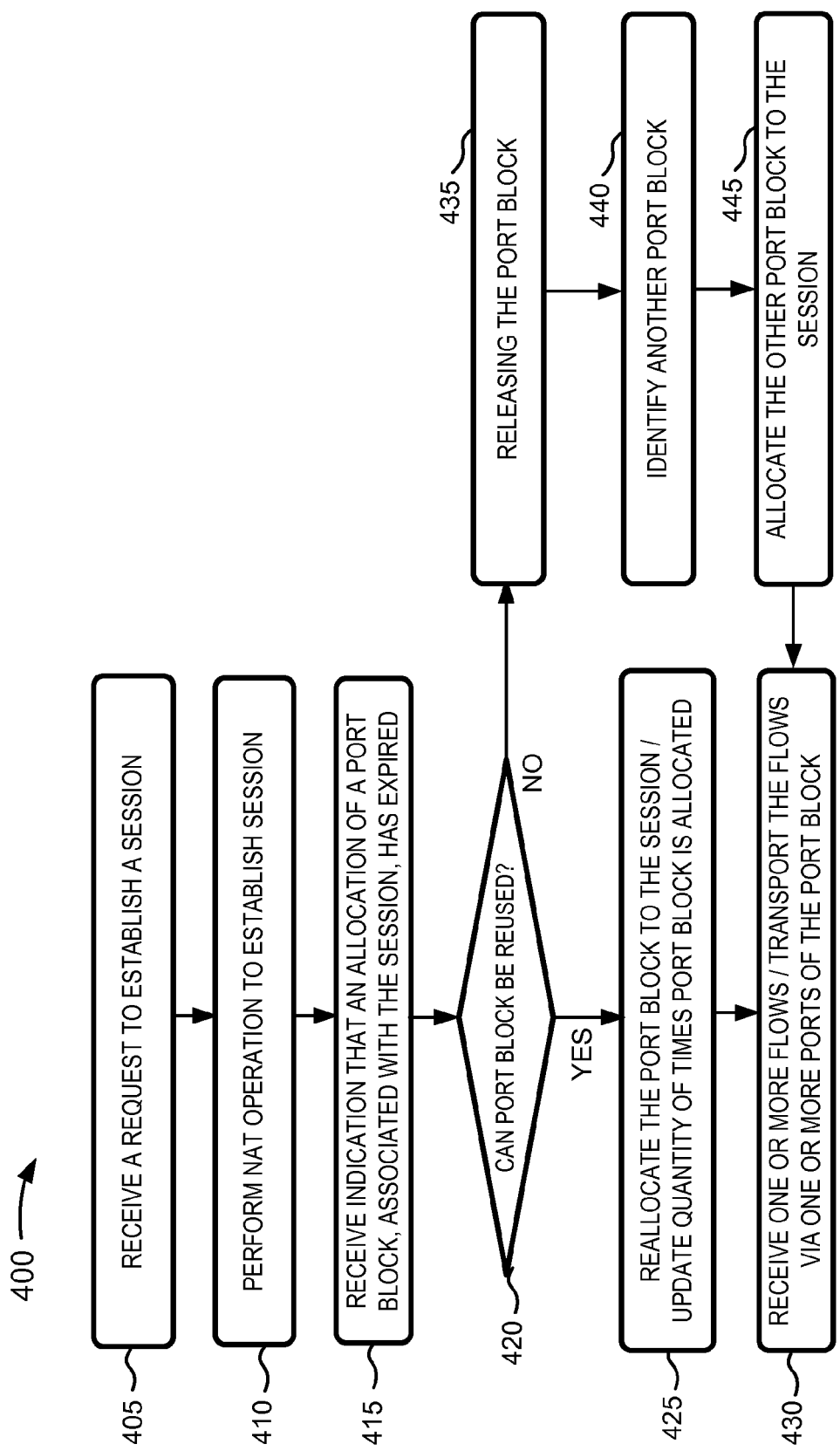
FIG. 4 is a flow chart of an example process for determining whether a port block can be retained and reused for a communication session.

FIG. 4 is a flow chart of an example process 400 for determining whether a port block can be retained and reused for a communication session. In one example implementation, process 400 may be performed by node 120-2. Alternatively, or additionally, some or all of process 400 may be performed by a device or collection of devices separate from, or in combination with, node 120-2.

As shown in FIG. 4, process 400 may include receiving a request to establish a session (block 405) and performing a NAT operation to establish the session (block 410). For example, node 120-2 may receive a request, from node 120-1, to establish a communication session associated with host 110. Node 120-2 may, in response to the request, perform a NAT operation to establish NAT bindings on which the session is to be established and/or maintained. Node 120-2 may, for example, associate a public IP address with a private IP address to be used by node 120-1. Node 120-2 may also, or alternatively, identify a first port block to allocate to the session and may associate the first port block with the public IP address and/or the private IP address. Node 120-2 may store a value that identifies a quantity of times (e.g., 1) that the port block has been allocated to the session. In one example, the first port block may be sized based on a greater quantity of ports than another port block to be allocated at a later time in a manner to be described in greater detail below with respect to FIG. 5. Additionally, or alternatively, node 120-2 may perform a look up operation, using LRU list, to identify a least recently used port block to allocate, as the first port block, to the session in a manner to be described in greater detail below with respect to FIG. 8.

Node 120-2 may receive a flow of traffic from node 120-1 and may allocate a port, associated with the first port block, to the flow of traffic. Node 120-2 may also, or alternatively, transport the flow of traffic, to network 140, via the port. Node 120-2 may also, or alternatively, identify a start time at which the port is allocated to the flow of traffic and/or may identify an end time at which the allocation of the port is to expire. Similarly, node 120-2 may allocate other ports to other flows of traffic associated with the session until all ports, associated with the first port block, have been allocated. Node 120-2 may allocate a second port block to the session that allows further flows of traffic to be transported to and/or from network 140 via ports, associated with the second port block, that have been allocated to the further flows of traffic.

As also shown in FIG. 4, process 400 may include receiving an indication that an allocation, of a port block, associated with the session, has expired (block 415). For example, node 120-2 may receive an indication that a port, associated with the first port block has expired and/or that a traffic flow associated with the port no longer exists. Additionally, or alternatively, node 120-2 may receive other indications that other ports, associated with the first port block, have expired and/or that other traffic flows, associated with the other ports, no longer exist. Based on the indications that the traffic flows, associated with the first port block, no longer exist and/or that allocation of the ports, associated with the first port block, have expired, node 120-2 may determine whether the first port block is to be released.

If the port block can be reused (block 420—YES), process 400 may include reallocating the port block to the session and updating a quantity of times that the port block is reused (block 425). For example, node 120-2 may identify a quantity of times that the first port block has been allocated to the session. When the quantity of times that the first block has been allocated is less than a threshold, node 120-2 may reuse the port block by reallocating the first port block to the session. When reallocating the first port block, node 120-2 may reset start times and/or end times associated with the ports within the first port block. Additionally, or alternatively, node 120-2 may update the quantity of times (e.g., from 1 to 2) that the first port block has been allocated to the session.

As further shown in FIG. 4, process 400 may include receiving one or more traffic flows and transporting the traffic flows via one or more ports associated with the port block (block 430). For example, node 120-2 may receive, from node 120-1, one or more traffic flows associated with session. Node 120-2 may, as a result of receiving the traffic flows, determine that ports, associated with other port blocks that are allocated to the session, are not available. When ports, associated with the other blocks are not available, node 120-2 may allocate one or more ports, associated with the reallocated first port block, to the traffic flows. Node 120-2 may also, or alternatively, transport the traffic flows to and/or from network 140 via the allocated ports associated with the reallocated first port block.

If the port block cannot be reused (block 420—NO), process 400 may include releasing the port block (block 435) and identifying another port block (block 440). For example, node 120-2 may determine that the quantity of times that the first port block has been allocated to the session is not less than the threshold. When the quantity of times is not less than the threshold, node 120-2 may release the first port block by disassociating the first port block and/or the ports, associated with the first port block, with the session. Releasing the first port block may enable the first port block to be allocated to another session being processed by node 120-2 and/or another node 120.

Additionally, or alternatively, node 120-2 may allocate ports, within a further port block associated with the session, to traffic flows associated with the session. Node 120-2 may also, or alternatively, transport the traffic flows to and/or from network 140 via the ports associated with the further port block. When an insufficient quantity of ports, associated with the further port block, is available to be allocated to the traffic flows, node 120-2 may identify another port block that is available to be allocated to the session. In one example, node 120-2 may obtain LRU list to look up a least recently used port block to be allocated to the session in a manner to be described in greater detail below with respect to FIG. 8.

As also shown in FIG. 4, process 400 may include allocating the other port block to the session (block 445) and receiving one or more traffic flows and transporting the traffic flows via one or more ports associated with the other port block (block 430). For example, node 120-2 may allocate the other port block to the session in a manner similar to that described above with respect to block 410. Node 120-2 may receive one or more traffic flows and may allocate one or more ports, associated with the other port block, to the traffic flows and may transport the traffic flows via the one or more ports associated with the other port block.

Figure 5:
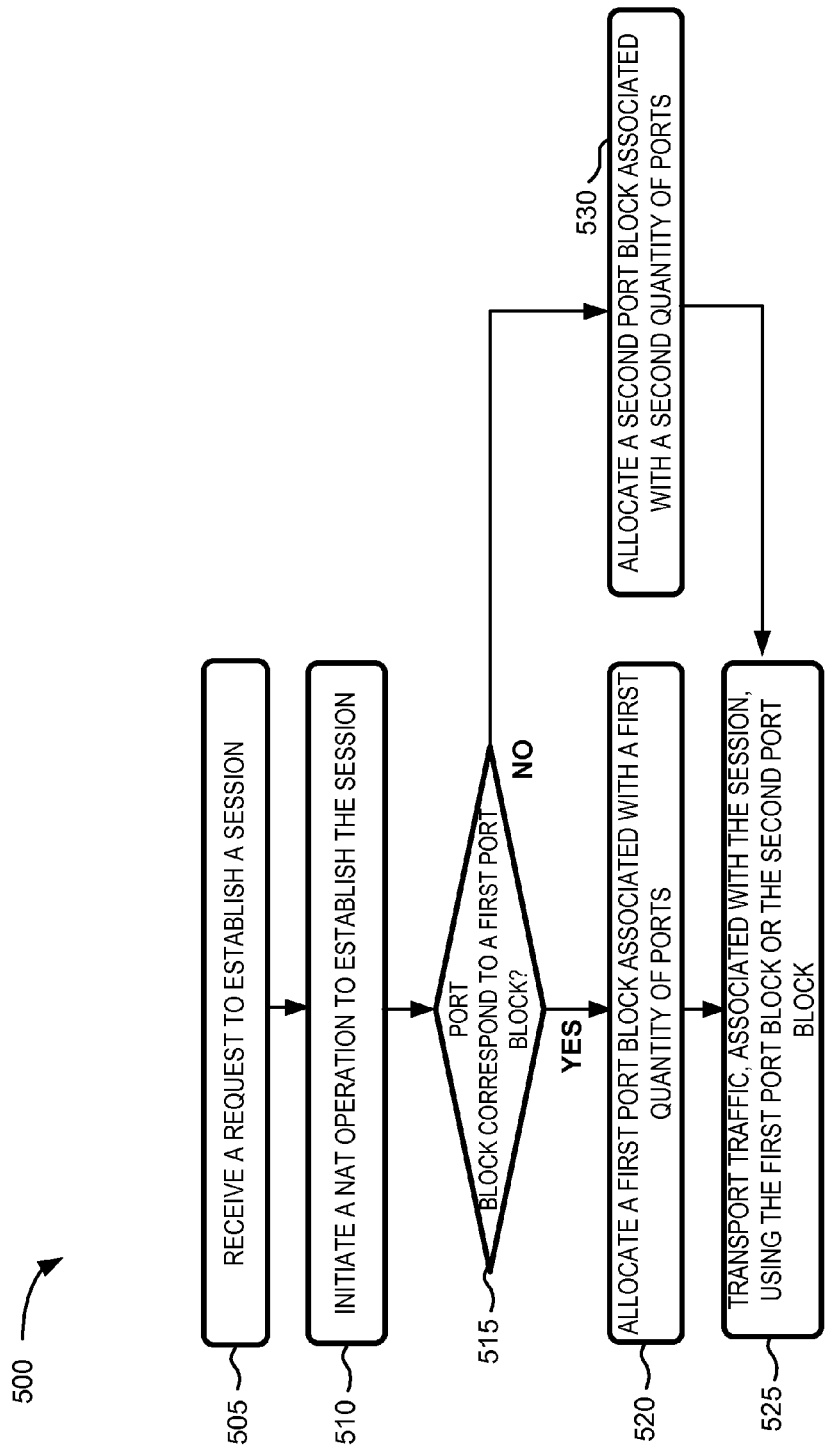
FIG. 5 is a flow chart of an example process for determining a size of a port block to be allocated for a session.
Figure 6:
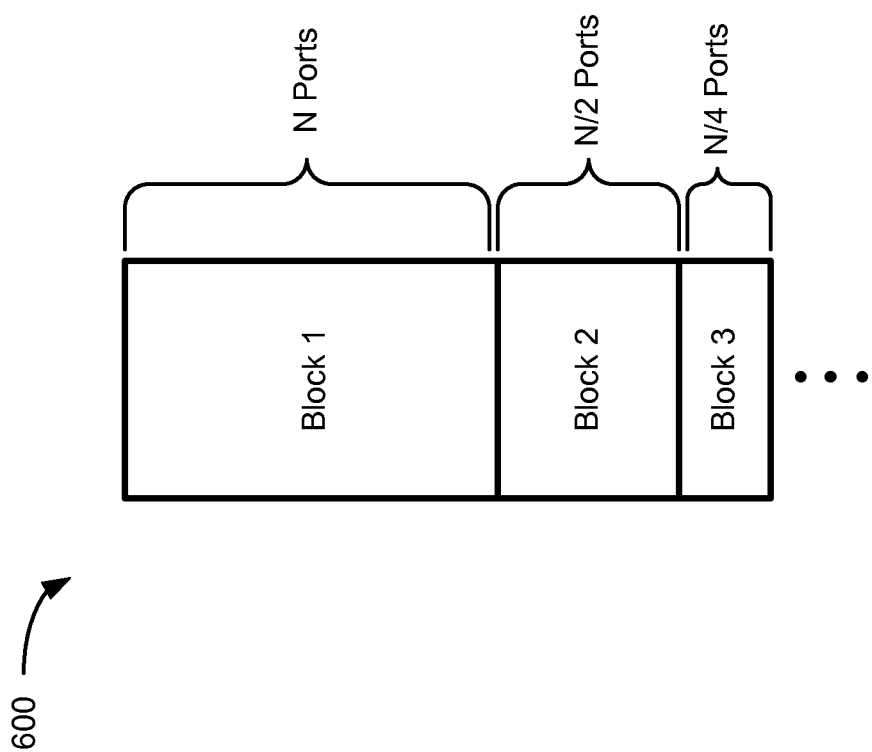
FIG. 6 is a diagram of example port blocks that are sized as multiples of a first port block.

FIG. 5 is a flow chart of an example process 500 for determining a size of a port block to be allocated to a session. In one example implementation, process 500 may be performed by node 120-2. In another example implementation, some or all of process 500 may be performed by a device or collection of devices separate from, or in combination with, node 120-2. FIG. 6 is a diagram of example port blocks 600 that are allocated to a session. In the description below, a portion of process 500 of FIG. 5 will be described with references to example port blocks 600 of FIG. 6.

As shown in FIG. 5, process 500 may include receiving a request to establish a session (block 505) and initiating a NAT operation to establish the session (block 510). For example, node 120-2 may receive a request, from node 120-1, to establish a communication session associated with host 110. Node 120-2 may, in response to the request, initiate a NAT operation to establish NAT bindings on which the session is to be established and/or maintained. Node 120-2 may, for example, associate a public IP address with a private IP address to be used for the session. The private IP address may be used by node 120-1 when transporting traffic flows to content provider 130 and/or network 140 via node 120-2. The public IP address may be used by content provider 130 and/or network 140 when transmitting traffic flows to node 120-1 via node 120-2.

If a port block corresponds to a first port block (block 515—YES), process 500 may include allocating a first port block associated with a first quantity of ports (block 520). For example, node 120-2 may identify a port block to be allocated to the session and may associate the identified port block with the public IP address and/or the private IP address to establish the communication session. When the port block to be allocated corresponds to a first port block, to be used to establish the session, node 120-2 may identify a port block that includes a first quantity of ports. The first quantity of ports may be greater than a second quantity of ports associated with another port block to be allocated to the session at a later time if the ports of the first block are no longer available.

For example, as shown in FIG. 6, port blocks 600 may include a group of port blocks, such as a first port block (e.g., block 1), a second port block (e.g., block 2), a third port block (e.g., block 3), etc. that are available to be allocated to a session. The first port block may include a first quantity of ports (e.g., N quantity of ports, where N≥1). The first quantity of ports may be greater than a quantity of ports associated with the second port block or the third port block. For example, the second port block may include a second quantity of ports (e.g., N/2) that is less than the first quantity of ports and the third port block may include third quantity of ports (e.g., N/4) that is less than the first quantity of ports and/or the second quantity of ports.

Additionally, or alternatively, the first quantity of ports may correspond to multiples of the second quantity of ports and/or third quantity of ports. In one example, the first quantity of ports may include twice as many ports as the second quantity of ports (e.g., N>N/2). In another example, the first quantity of ports may include four times as many ports as the third quantity of ports (e.g., N>N/4). Alternatively, or additionally, the first quantity of ports may be greater than the second or third quantity of ports by an amount that is different (e.g., three times as many, five times as many, ten times as many, etc.) than twice as many ports (e.g., with respect to the second port block) and/or four times as many ports (e.g., with respect to the third block) as described above.

When the port block is to be allocated to establish the session, node 120-2 may allocate the first port block, that includes the first quantity of ports, to the session. Node 120-2 may, for example, associate the first port block with the private IP address and/or the public IP address.

Returning to FIG. 5, if the port block does not correspond to the first port block (block 515—NO), process 500 may include allocating a second port block associated with a second quantity of ports (block 530). For example, node 120-2 may determine that no ports, associated with a first port block that was allocated to establish the session, are available for use in transporting a traffic flow associated with the session. Node 120-2 may, for example, determine that no ports are available when the ports, associated with the first port block, have expired and/or when the ports are being used to transport other flows associated with the session. When no ports, associated with the first port block, are available, node 120-2 may allocate a second port block to the session. The second port block may include a second quantity of ports that is less than the first quantity of ports associated with the first port block.

Additionally, or alternatively, node 120-2 may identify a quantity of traffic flows, received from node 120-1, that are to be transported and may select a port block that includes a quantity of ports that are greater than the identified quantity of traffic flows. In one example, if a third quantity of ports (e.g., N/4) associated with a third port block (e.g., block 3 of FIG. 6) is greater than the identified quantity of traffic flows, node 120-2 may allocate the third port block to the session. Additionally, or alternatively, if the third quantity of ports is not greater than the identified quantity of traffic flows, node 120-2 may allocate a second port block to the session based on a determination that the second quantity of ports (e.g., N/2), associated with the second port block, is greater than the identified quantity of traffic flows.

As further shown in FIG. 5, process 500 may include transporting traffic, associated with the session, using the first port block (block 525). For example, node 120-2 may receive, from node 120-1, one or more traffic flows, associated with the session, and node 120-2 may transport the flows via ports associated with a port block that is allocated to the session. Node 120-2 may, for example, transport the traffic flows via one or more available ports associated with the first port block when the first port block is allocated to the session. Additionally, or alternatively, node 120-2 may transport the traffic flows via one or more available ports associated with the second port block when the second port block is allocated to the session.

Figure 7:
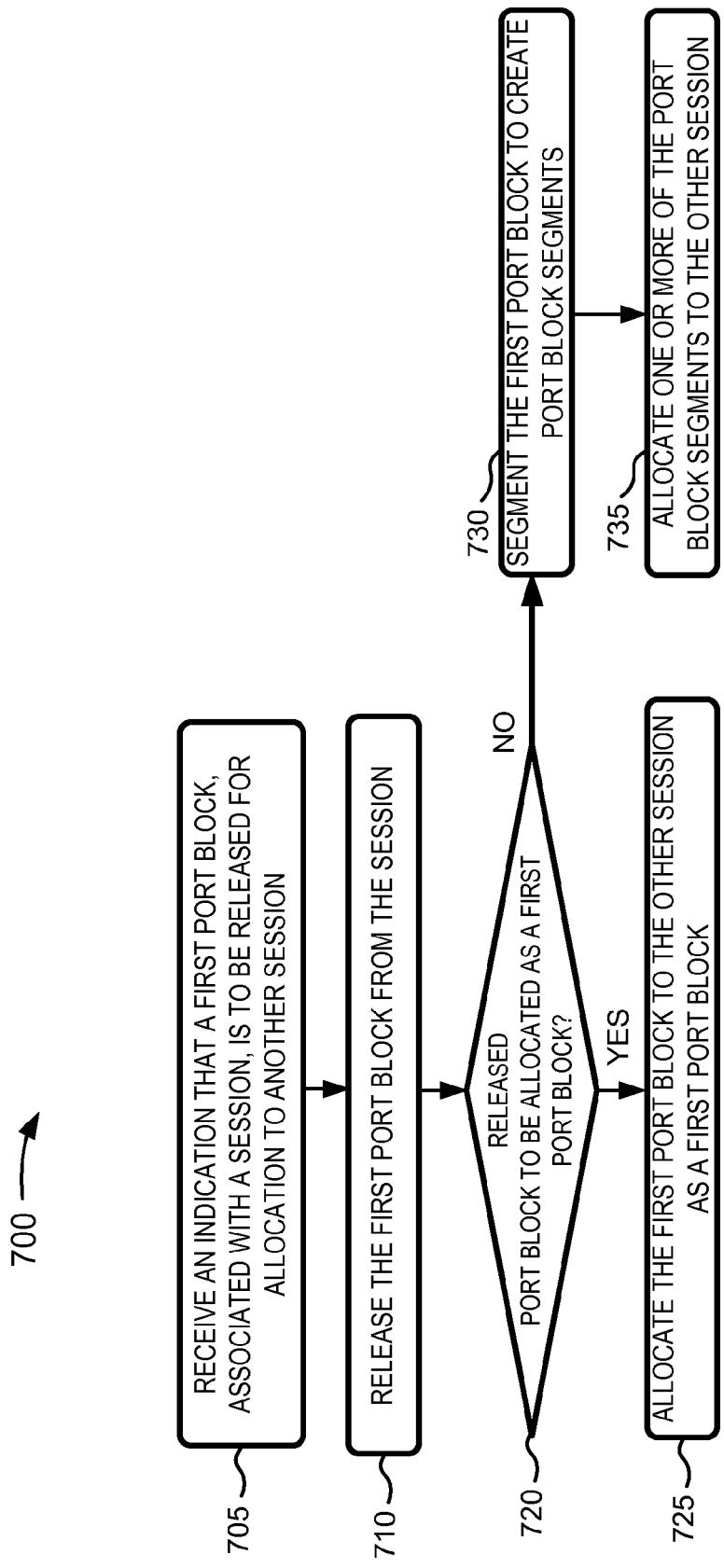
FIG. 7 is a flow chart of an example process for determining whether to segment a first port block being released from a session.

FIG. 7 is a flow chart of an example process 700 for determining whether to segment a first port block being released from a session. In one example implementation, process 700 may be performed by node 120-2. In another example implementation, some or all of process 700 may be performed by a device or collection of devices separate from, or in combination with, node 120-2.

As shown in FIG. 7, process 700 may include receiving an indication that a first port block, associated with a session, is to be released for allocation to another session (block 705) and releasing the first port block from the session (block 710). For example, node 120-2 may receive an indication that ports associated with a first port block, associated with a communication session, have expired and/or are not being used to transport traffic flows associated with the session. Additionally, or alternatively, node 120-2 may, in a manner similar to that described above with respect to block 420 of FIG. 4, determine that a quantity of times that the first block as been reused (e.g., reallocated to the session) is greater than a threshold. Node 120-2 may release the first block from the session when the ports, associated with the first port block, have expired and/or are not being used, and/or when the quantity of times that the first block has been reused is greater than the threshold. When releasing the first port block, for example, node 120-2 may disassociate the first port block from a public IP address, a private IP address, etc. associated with the session.

Disassociating the first port block may enable the first port block to be reallocated to another session. For example, node 120-2 may receive an indication that a port block is to be allocated to another session. Node 120-2 may allocate all or a portion of the first port block to the other session based on the release of the first port block from the session.

If the released port block is to be allocated as a first port block (block 715—YES), process 700 may include allocating the first port block to the other session as a first port block (block 725). For example, node 120-2 may determine whether a port block is to be allocated to the other session as a first port block (e.g., to establish the other session) or as a port block other than a first port block (e.g., to maintain an existing other session). When the port block is to be allocated to establish the other session, node 120-2 may allocate the first port block, released from the session, to the other session as a first port block. In this example, node 120-2 may initialize the start times and/or end times associated with ports within the first port block that was released from the session. Additionally, or alternatively, node 120-2 may associate the ports, within the first port block, with a public IP address and/or a private IP address associated with the other session. Node 120-2 may use one or more ports, associated with the first port block, to transport one or more traffic flows associated with the other session.

If the released port block is not to be allocated as the first port block (block 715—NO), process 700 may include segmenting the first port block to create port block segments (block 730) and allocating one or more of the port block segments to the other session (block 735). For example, node 120-2 may determine that a port block is to be allocated to the other session (e.g., to maintain the other session) as a port block other than the first port block. When the port block is to be allocated to maintain the other session, node 120-2 may determine that all of the ports, associated with the first port block, released from the session, are not to be allocated to the other session. For example, node 120-2 may cause the first port block, released from the session, to be segmented into two or more segmented port blocks. Each of the segmented port blocks, may include a respective portion of ports associated with the first port block. For example, the segmented port blocks may, in a manner similar to that described with respect to FIG. 6, include discrete portions (e.g., N/2, N/3, N/4, N/10, etc.) of the ports associated with the first port block released from the session. In one example, the first port block may be segmented into two segmented port blocks, each including two equal portions (e.g., N/2) of the ports associated with the first port block. Alternatively, or additionally, the first port block may be segmented into three segmented port blocks, each including three equal portions (e.g., N/3) of the ports associated with the first port block. Additionally, or alternatively, the first port block may be segmented into port blocks of different discrete portions of the ports of the first port block (e.g., one segmented port block with N/2 ports and two segmented port blocks with N/4 ports; etc.).

Additionally, or alternatively, node 120-2 may determine a quantity of traffic flows that are to be transported with respect to the other session and may cause the first port block to be segmented in a manner to create a segmented port block that includes a discrete quantity of ports that is greater than a quantity of the flows to be transported.

Node 120-2 may allocate one or more of the segmented port blocks to the other session. Node 120-2 may initialize the start times and/or end times associated with ports within the segmented port blocks to be allocated to the other session. Additionally, or alternatively, node 120-2 may associate the ports, within the segmented port blocks, with a public IP address and/or a private IP address associated with the other session. Node 120-2 may use one or more ports, associated with the segmented port block, to transport one or more traffic flows associated with the other session.

Figure 8:
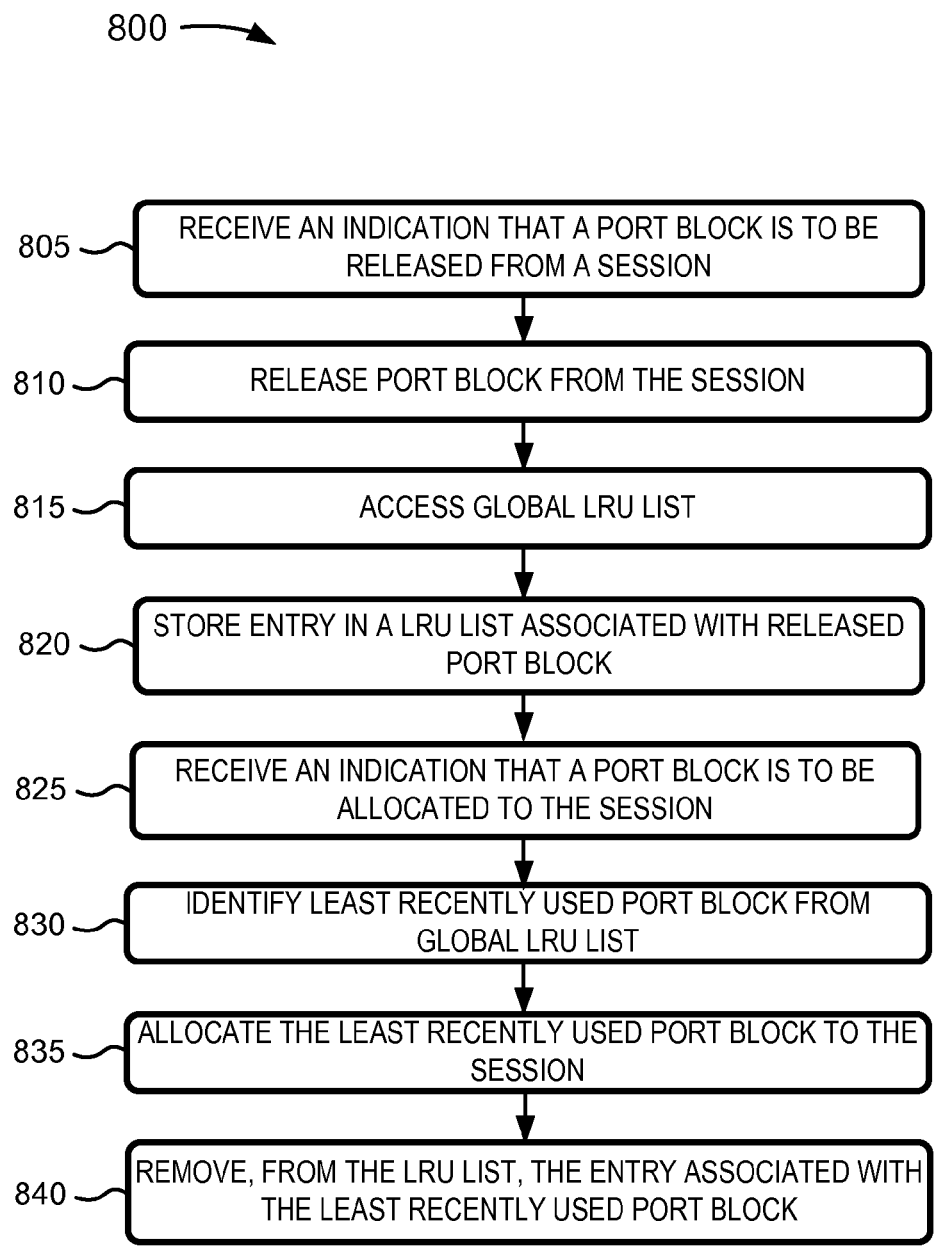
FIG. 8. is a flow chart of an example process for deferring reallocation of a released port block using a global least recently used (LRU) list of port blocks.
Figure 9:
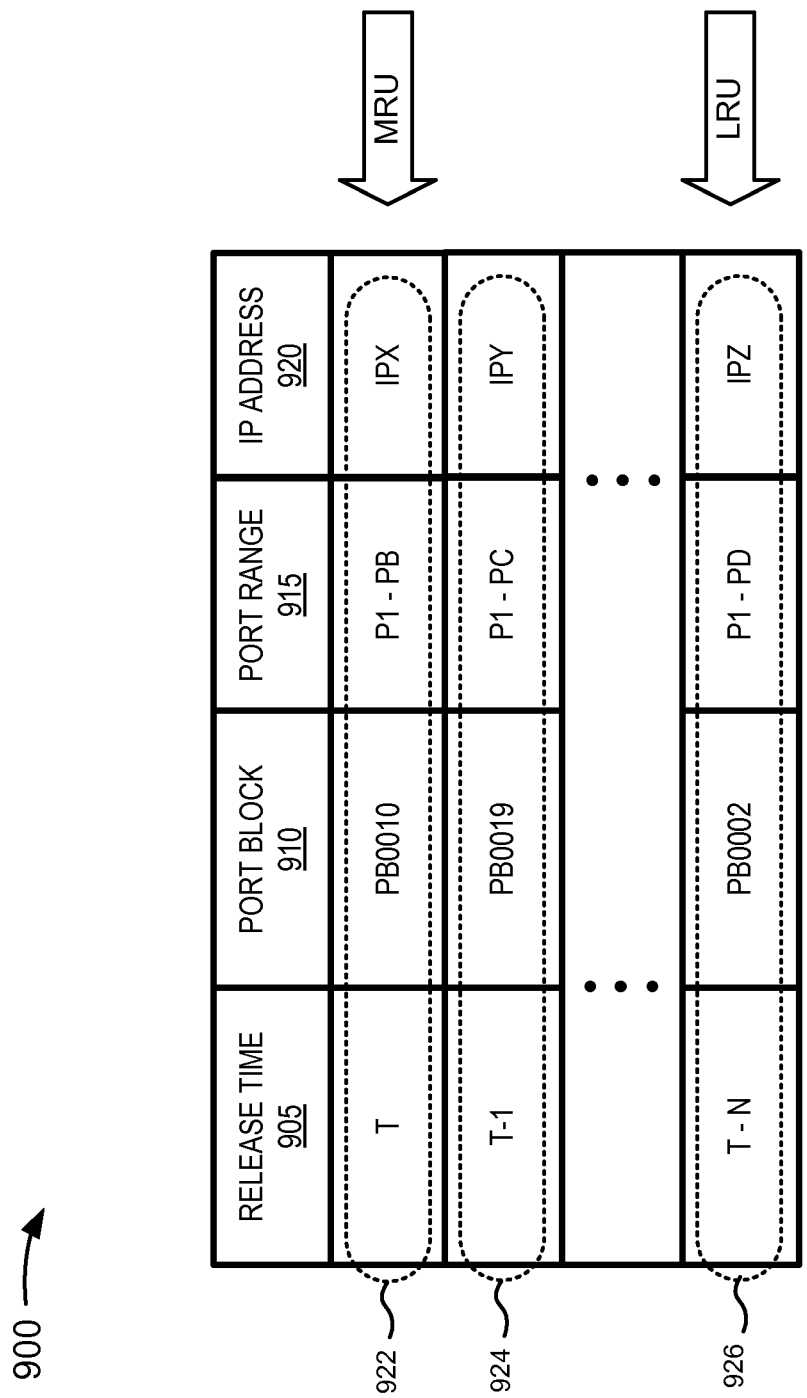
FIG. 9 is an example data structure that stores the global LRU list.

FIG. 8 is a flow chart of an example process 800 for deferring reallocation of a released port block using a global LRU list of port blocks. In one example implementation, process 800 may be performed by node 120-2. In another example implementation, some or all of process 800 may be performed by a device or collection of devices separate from, or in combination with, node 120-2. FIG. 9 is a diagram of an example data structure 900 that stores the global LRU list. In the description below, a portion of process 800 of FIG. 8 will be described with references to data structure 900 of FIG. 9.

As shown in FIG. 8, process 800 may include receiving an indication that a port block is to be released from a session (block 805), and releasing the port block from the session (block 810). For example, node 120-2 may receive an indication that a port block is to be released from a session. Node 120-2 may receive the indication when ports, within a port block associated with the session, have expired and/or are not being used, and/or when a quantity of times that the block has been reused is greater than a threshold. Node 120-2 may, in response to the indication, release the port block from the session. Node 120-2 may also, or alternatively, disassociate the port block from a public IP address, a private IP address, etc. associated with the session.

As also shown in FIG. 8, process 800 may include accessing a global LRU list (block 815) and storing an entry, associated with releasing the port block, in the LRU list (block 820). For example, node 120-2 may access a LRU list as a result of releasing the port block from the session. In one example, node 120-2 may access the LRU list stored within a memory associated with node 120-2. In another example, node 120-2 may communicate with another node 120-2 to access the LRU list. Additionally, or alternatively, node 120-2 may store, in the LRU list, an entry associated with releasing the port block from the session.

For example, as shown in FIG. 9, data structure 900 may include a collection of fields, such as a release time field 905, a port block field 910, a port range field 915, and an IP address field 920. Fields 905-920 are included in data structure 900 for explanatory purposes only. In another implementation, there may be additional fields, fewer fields, different fields, or differently arranged fields that are shown with respect FIG. 9.

Release time field 905 may identify a time at which node 120-2 releases a port block from a session. Port block field 910 may store information that uniquely identifies a particular port block (e.g., a port block identifier, etc.). Port range field 915 may store information that uniquely identifies each port (e.g., a port identifier) associated with the particular port block. IP address field 920 may store information associated with an IP address with which the particular port block is associated. The IP address may, for example, be associated with a pool of IP addresses (hereinafter referred to, in some instances, as a "NAT pool") that are assigned to node 120-2.

By way of example, node 120-2 may identify a time at which a port block is released from a session. Node 120-2 may also, or alternatively, store an entry in the LRU list that identifies the release time (e.g., T), the port block (e.g., PB0010), a port range (e.g., P1-PB) associated with the released port block, and/or an IP address (e.g., IPX) associated with the release port block (e.g., as shown by ellipse 922). Node 120-2 may store the entry, in the LRU list, in a manner that identifies the released port block as a most recently used (MRU) port block (e.g., shown by the arrow labeled "MRU"). In one example, the entry corresponding to the MRU may correspond to a first entry within the LRU list. Node 120-2 may store information associated with other, previously released, port blocks in the LRU list (e.g., shown as ellipses 924 and 926). Additionally, or alternatively, the LRU list may store an entry (e.g., shown as ellipse 926) that has been stored for a longer period of time than other entries within the LRU list. The entry that has been stored for the longer period of time may correspond to a least recently used port block. In one example, the entry associated with the least recently used port block may correspond to a last entry within the LRU list (e.g., shown by the arrow labeled "LRU").

Returning to FIG. 8, process 800 may include receiving an indication that a port block is to be allocated to the session (block 825) and identifying a least recently used port block from the LRU list (block 830). For example, node 120-2 may receive one or more traffic flows associated with the session, and may determine that ports, associated with port blocks that are allocated to the session, have been exhausted and/or are otherwise not available. Based on the determination that no ports are available to transport the traffic flows, node 120-2 may allocate a port block to the session. For example, node 120-2 may access the LRU list to identify an entry that corresponds to a least recently used port block. The entry may, for example, be stored within the LRU list for a longer period of time than any other entry within the LRU list. Additionally, or alternatively, the entry may be located at a position (e.g., a last position, a first position, etc.), within the LRU list, that corresponds to the least recently used position within the LRU list. Node 120-2 may, based on the identified entry, identify a least recently used port block.

As yet further shown in FIG. 8, process 800 may include allocating, to the session, the least recently used port block (block 835) and removing, from the LRU list, the entry associated with the least recently used port block (block 840). For example, node 120-2 may allocate the least recently used port block to the session and may transport the traffic flows via one or more ports associated with the least recently used port block. Additionally, or alternatively, node 120-2 may cause the entry, associated with the least recently used port block, to be removed from the memory and/or overwritten within the memory. Node 120-2 may also, or alternatively, cause other entries, within the LRU list to shift (e.g., upward, downward, etc.) so that a next entry, that has been stored for a longer period of time than other entries within the LRU list, is located at a position, within the LRU list, that corresponds to the least reliable position.

Systems and/or methods, described herein, may enable a node to perform a NAT operation by releasing and/or allocating port blocks in a secure manner. The node may determine a quantity of times that a port block has been allocated and/or reused to conduct a session. The node may determine that the port block is to be released when the quantity of times is greater than a threshold. The node may also, or alternatively, allocate a different block for the session when the node determines that the port block is to be released. Releasing the port block and/or allocating the different port block may increase a level of security associated with the communication session.

Additionally, or alternatively, the node may allocate a first port block to a session that is larger than one or more subsequent port blocks that are allocated to the session. The first port block, being larger than the subsequent port blocks, may reduce a quantity of port blocks that are allocated to establish a session. Additionally, or alternatively, the allocation of smaller subsequent port blocks may enable ports to be allocated to the session on an as needed basis based on resources being used to maintain the session.

Additionally, or alternatively, the node may release and/or reallocate a port block using a LRU list associated with all IP addresses allocated to the node. The LRU list may enable the node to identify and allocate a least recently used port block. Thus, the period of time when the least recently used port block is not reallocated may avoid ambiguities or errors associated with network time corrections within the network. Additionally, or alternatively, allocation of the least recently used block based on the LRU list may cause port block utilization to resemble a random utilization, which may increase a level of security within the network.

The foregoing description of implementations provides illustration and description, but is not intended to be exhaustive or to limit the implementations to the precise form disclosed. Modifications and variations are possible in light of the above implementations or may be acquired from practice of the implementations.

For example, while series of blocks have been described with regard to FIGS. 4, 5, 7, and 8 the order of the blocks may be modified in other implementations. Further, non-dependent blocks may be performed in parallel.

It will be apparent that example aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential to the implementations unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A first node device comprising:
a processor, at least partially implemented in hardware, to:
receive, from a second node device, a request to establish a session;
perform, based on the request, a network address translation (NAT) operation to establish the session, the NAT operation causing:
a first port block to be allocated to the session,
the first port block including a first set of ports via which traffic, associated with the session, is transported;
determine that the first set of ports are no longer available for the session;
determine a second port block to be allocated to the session,
the second port block including a second set of ports via which the traffic, associated with the session, is to be transported,
a first quantity of ports, associated with the first set of ports, including two or more multiples of a second quantity of ports associated with the second set of ports, and
the second set of ports being determined based on a quantity of traffic flows to be transported via the session; and
allocate the second port block to the session.

2. The first node device of claim 1, where the processor is further to:
perform a look up operation using a least recently used (LRU) list to identify a LRU port block to allocate to the session; and
determine the second port block is the LRU port block.

3. The first node device of claim 2, where the processor is further to:
remove an entry associated with the second port block from the LRU list.

4. The first node device of claim 1, where the processor is further to:
release the first port block from the session; and
store a first entry, associated with the first port block, in a least recently used (LRU) list.

5. The first node device of claim 4, where the processor is further to:
identify a LRU port block from the LRU list to allocate to the session; and
remove a second entry, associated with the second port block, from the LRU list.

6. The first node device of claim 1, where, when determining that the first set of ports are no longer available for the session, the processor is to:
determine a quantity of times that the first port block has been allocated to the session; and
determine that the first set of ports are no longer available for the session based on comparing the quantity of times to a threshold.

7. The first node device of claim 1, where the processor, when determining the second port block to be allocated to the session, is to:
perform a look up operation using a least recently used (LRU) list to identify a LRU port block to allocate to the session;
determine the second port block is the LRU port block;
remove an entry associated with the second port block from the LRU list;
release the first port block from the session; and store a first entry, associated with the first port block, in the LRU list.

8. A method, comprising:
receiving, by a node device, a request to establish a first session;
performing, by the node device, a network address translation (NAT) operation to establish the first session, the NAT operation causing:
 allocating of a first port block to the first session,
  the first port block including a first set of ports via which traffic, associated with the first session, is transported;
determining, by the node device, that a quantity of times that the first port block has been allocated to the first session is not fewer than a threshold;
determining, by the node device, that the first set of ports are no longer available for the first session based on determining that the quantity of times that the first port block has been allocated to the first session is not fewer than the threshold;
releasing, by the node device, the first port block from the first session;
segmenting, by the node device, the first port block into one or more port block segments,
 the one or more port block segments including a second set of ports; and
allocating, by the node device, the one or more port block segments to a second session.

9. The method of claim 8, further comprising:
determining, by the node device, that the first set of ports are not being used to transport traffic associated with the first session; and
where determining that the first set of ports are no longer available for the first session includes:
 determining that the first set of ports are no longer available for the first session based on determining that the first set of ports are not being used to transport traffic associated with the first session.

10. The method of claim 8, further comprising:
allocating, by the node device, the second set of ports to the second session,
 the second set of ports being different from the first set of ports.

11. The method of claim 8, further comprising:
determining, by the node device, a quantity of traffic associated with the second session to be transported,
 a quantity of the second set of ports being greater than the quantity of traffic associated with the second session.

12. The method of claim 8, further comprising:
determining, by the node device, that all of the first set of ports are not to be allocated to the second session; and
allocating, by the node device, the second set of ports to the second session,
 the second set of ports not including any of the first set of ports.

13. The method of claim 8, where the threshold is a first threshold;
where the method further comprises:
 determining, by the node device, that a quantity of times the first port block has been reused is greater than a second threshold; and
where determining that the first set of ports are no longer available for the first session includes:
 determining that the first set of ports are no longer available for the first session based on determining that the quantity of times the first port block has been reused is greater than the second threshold.

14. The method of claim 8, where allocating the one or more port block segments to the second session comprises:
initializing, by the node device, at least one of a start time or an end time, associated with the one or more port block segments, to be allocated to the second session,
 the start time identifying a time when the one or more port block segments is allocated to the second session, and
 the end time identifying a time when the allocation, between the one or more port block segments and the second session, expires.

15. A system, comprising:
a network device to:
 receive a request to establish a session associated with a host;
 perform a network address translation (NAT) operation to establish NAT bindings on which the session is to be established, the NAT operation causing:
  an allocation of a first port block to the session,
   the first port block including a first set of ports via which traffic, associated with the session, is transported;
 determine that a quantity of times the first port block has been reused is greater than a threshold;
 release the first port block from the session based on determining that the quantity of times the first port block has been reused is greater than the threshold;
 determine a second port block to be allocated to the session; and
 allocate the second port block to the session.

16. The system of claim 15, where the network device is further to:
store an entry associated with the first port block in a least recently used (LRU) list.

17. The system of claim 15, where the network device is further to:
identify a least recently used (LRU) port block from an LRU list to allocate to the session; and
allocate the LRU port block to the session.

18. The system of claim 17, where the network device is further to:
receive traffic associated with the session via a second set of ports associated with the LRU port block,
 the second set of ports including fewer ports than the first set of ports.

19. The system of claim 15, where the network device is further to:
determine the second port block is a least recently used (LRU) port block before allocating the second port block to the session.

20. The system of claim 15, where the network device is further to:
receive an indication that the first port block has been allocated to another session, and
where, when releasing the first port block from the session, the network device is to:
 release the first port block from the session after receiving the indication.

* * * * *